United States Patent [19]
Dodds

[11] Patent Number: 5,843,532
[45] Date of Patent: Dec. 1, 1998

[54] COATED CONDUIT OUTLET FITTING AND METHOD AND APPARATUS FOR FORMING A COATED CONDUIT OUTLET FITTING

[75] Inventor: John Joseph Dodds, Westmoreland County, Penn Township, Pa.

[73] Assignee: Robroy Industries, Verona, Pa.

[21] Appl. No.: 771,170

[22] Filed: Dec. 20, 1996

Related U.S. Application Data

[62] Division of Ser. No. 330,718, Oct. 28, 1994, Pat. No. 5,621,189.

[51] Int. Cl.$^6$ .................................. B05D 1/18; B05C 3/02
[52] U.S. Cl. ........................ 427/430.1; 427/435; 427/123; 118/423; 118/429; 118/500
[58] Field of Search ................................ 427/430.1, 435, 427/123; 118/423, 429, 500

[56] References Cited

U.S. PATENT DOCUMENTS

| | | |
|---|---|---|
| 1,706,811 | 3/1929 | Pearson et al. . |
| 1,927,780 | 9/1933 | Anderson . |
| 2,272,178 | 2/1942 | McDowell et al. . |
| 2,498,135 | 2/1950 | Rock, Jr. . |
| 2,800,247 | 7/1957 | Appleton . |
| 2,910,209 | 10/1959 | Nelson . |
| 3,394,509 | 7/1968 | McKinley . |
| 3,430,799 | 3/1969 | Maier . |
| 3,434,900 | 3/1969 | Bender . |
| 3,577,753 | 5/1971 | Shah ............................................ 72/41 |
| 3,724,706 | 4/1973 | Slocum . |
| 3,762,939 | 10/1973 | Hunter . |
| 3,910,448 | 10/1975 | Evans et al. . |
| 3,968,020 | 7/1976 | Nagano et al. ........................... 118/503 |
| 4,148,137 | 4/1979 | Kindig ....................................... 29/732 |
| 4,658,623 | 4/1987 | Blanyer et al. ............................ 72/268 |
| 4,699,293 | 10/1987 | Duchrow . |
| 4,872,963 | 10/1989 | Van Horn ................................ 118/503 |
| 4,885,187 | 12/1989 | Koenig ..................................... 427/468 |
| 4,896,784 | 1/1990 | Heath . |
| 5,147,980 | 9/1992 | Ferguson, Jr. . |
| 5,587,126 | 12/1996 | Steketee, Jr. ............................. 264/568 |

FOREIGN PATENT DOCUMENTS 2280994  2/1995  United Kingdom .

OTHER PUBLICATIONS

Robroy Industries, Inc., Plasti–Bond Red®, brochure PR–101. Apr. 1993.
Ocal Inc., Ocal–Blue catalog, unknown date.

*Primary Examiner*—Shrive Beck
*Assistant Examiner*—Bret Chen
*Attorney, Agent, or Firm*—Webb Zeisenheim Bruening Logsdon Orkin & Hanson, P.C.

[57] ABSTRACT

A method of coating a conduit outlet fitting is disclosed. In the method, a tooling plate is positioned between a cover and a body of the conduit outlet fitting. The tooling plate has a hanger tooling block and a plug tooling block affixed thereto and positioned inside the body when the tooling plate is positioned between the body and the cover. A hanger is passed through a conduit opening and attached to the hanger tooling block. A plug is passed through another conduit opening and attached to the plug tooling block. The hanger and the plug each have a cap disposed thereon for covering an external end of their respective conduit openings. The assembled structure is suspended from the hanger and dipped into a liquid protective coating material to form an external coating thereon. The cover, the body and the tooling plate cooperate to form complementary male and female seals on the cover and the body. The dip coated structure is removed from the coating material and cured. The coating material around the tooling plate and beyond the caps on the hanger and plug are removed and the dip coated cover is removed from the body, and the tooling plate, hanger, plug and tooling blocks are removed from the dip coated body.

27 Claims, 13 Drawing Sheets

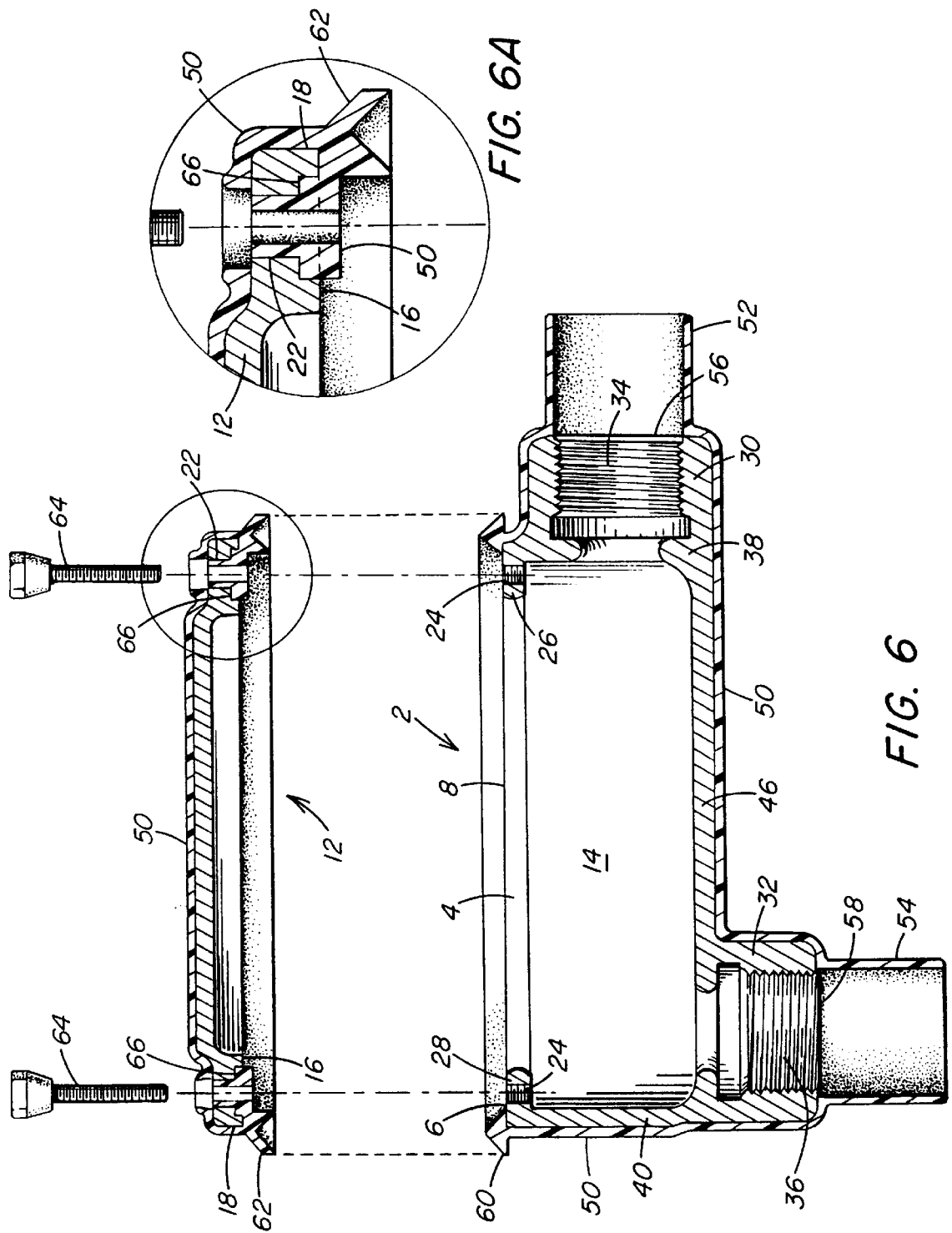

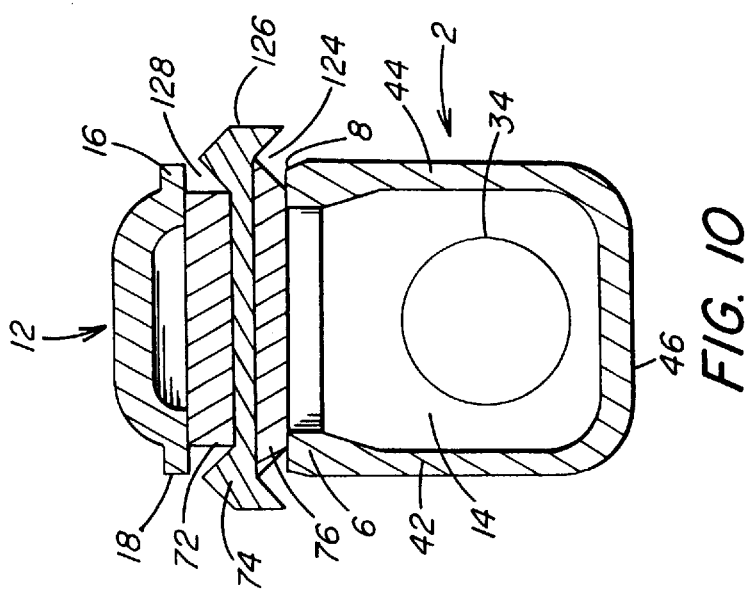
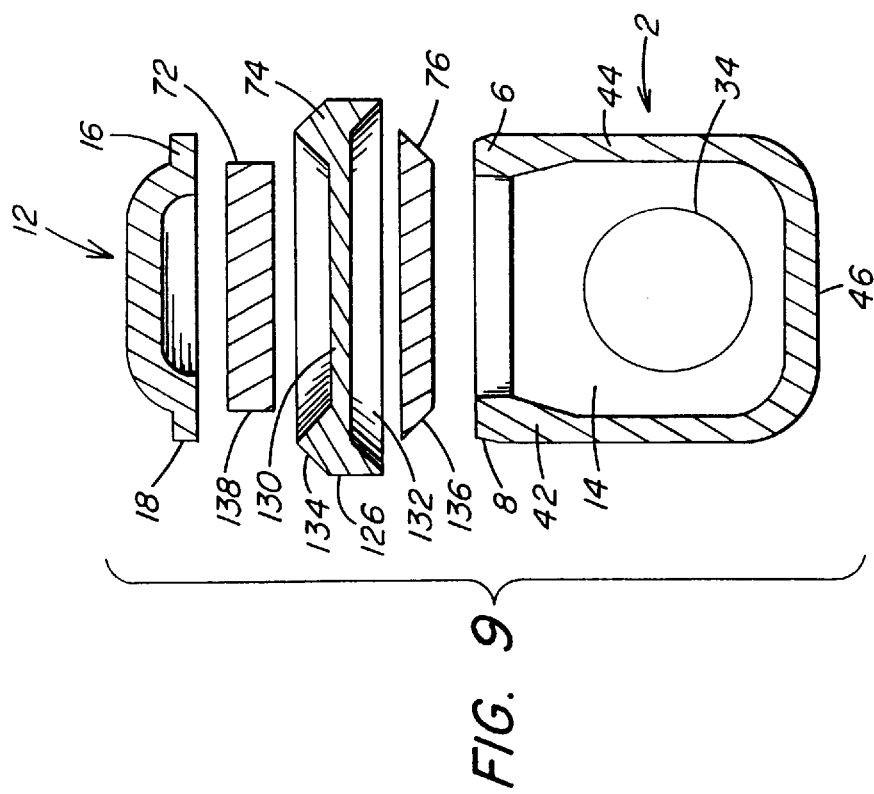

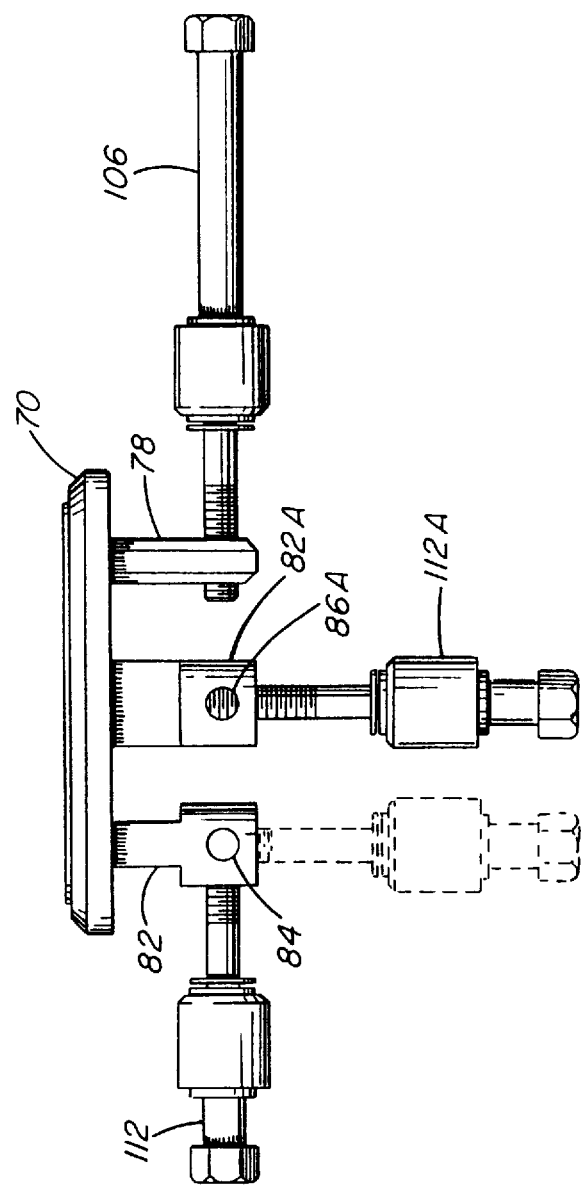

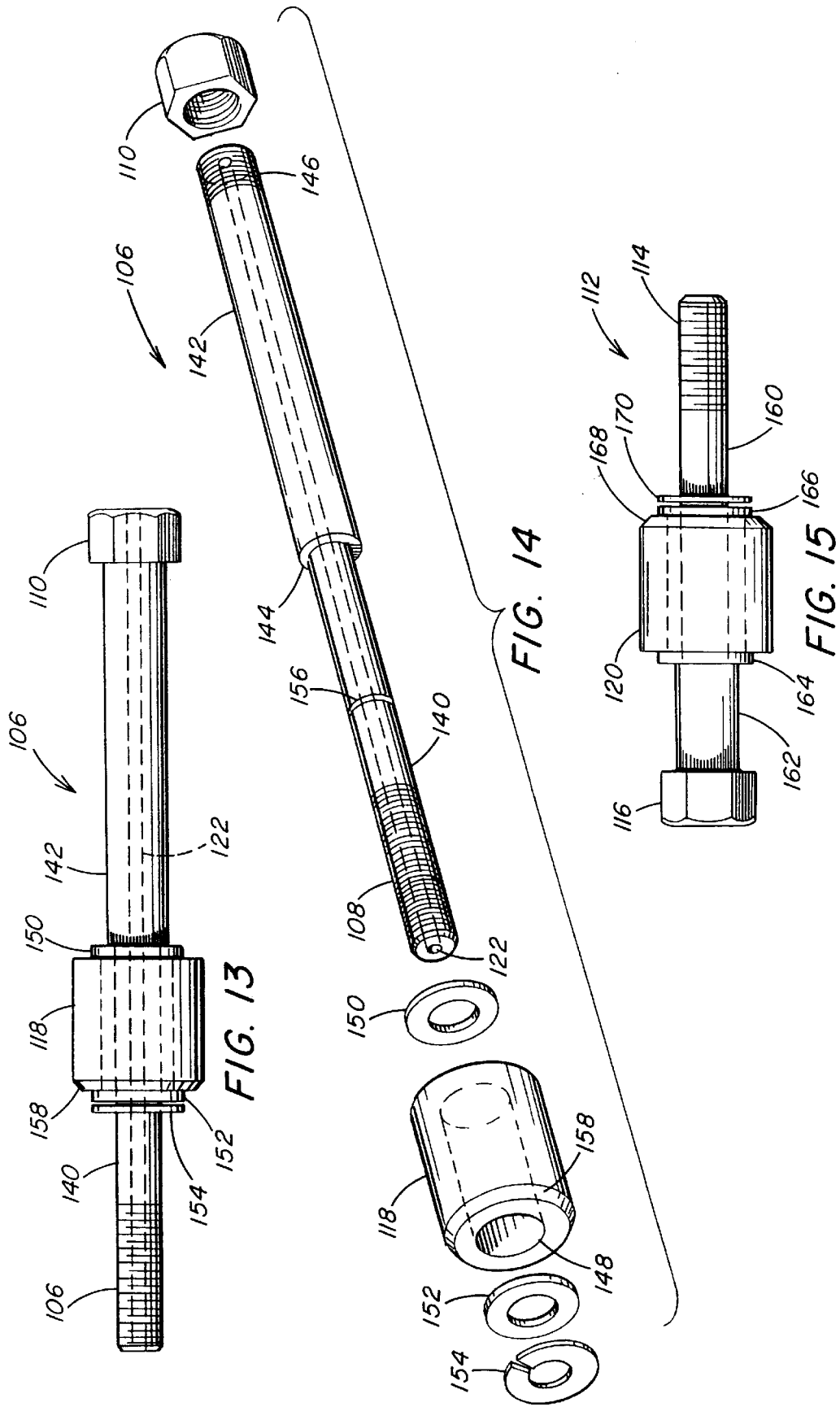

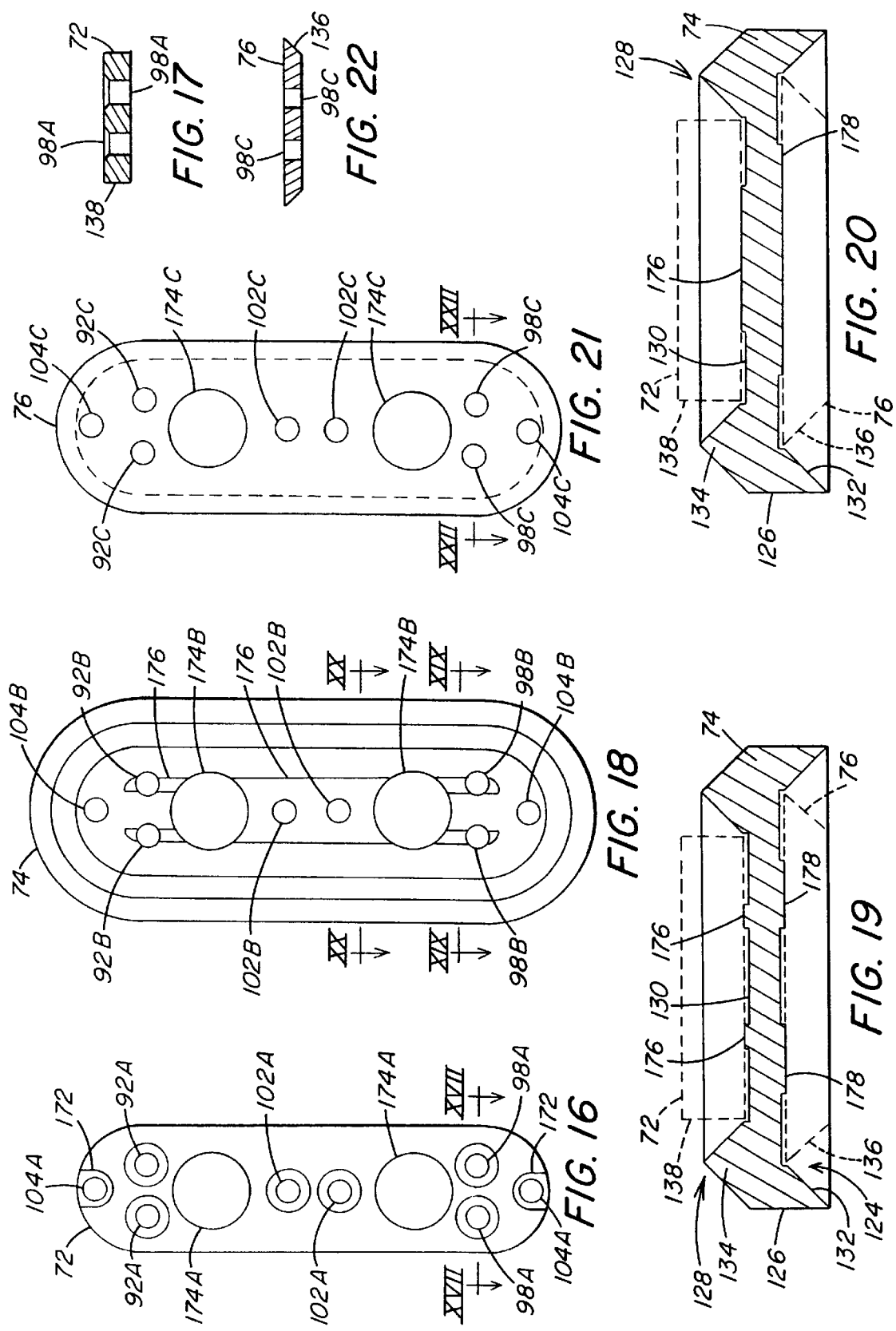

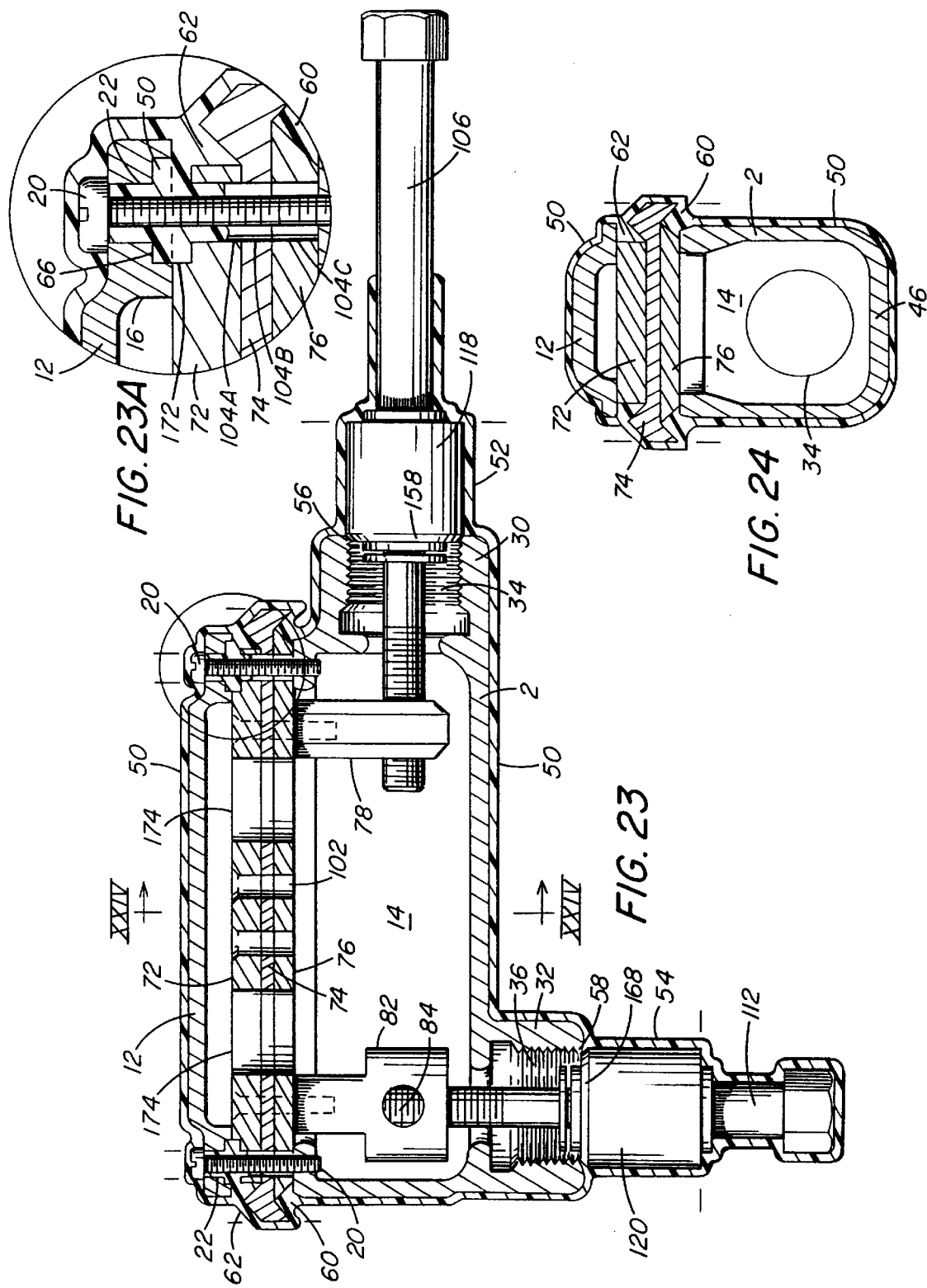

COATED CONDUIT OUTLET FITTING AND METHOD AND APPARATUS FOR FORMING A COATED CONDUIT OUTLET FITTING

This is a divisional of application(s) Ser. No. 08/330,718 filed on Oct. 28, 1994 now U.S. Pat. No. 5,621,189.

BACKGROUND OF THE INVENTION

1. Field of the Invention

This invention relates to conduit outlet fittings for electrical connections or the like and, more particularly, to a conduit outlet fitting coated with one or more protective materials.

2. Description of the Prior Art

The use of conduit outlet fittings, also known as junction boxes, for making electrical connections or the like is well known. A conduit outlet fitting typically has a hollow, open-topped base or body with one or more conduit openings therethrough. The conduit openings are typically internally threaded. Various electrical conduits are connected to the body and appropriate electrical connections between the conductors carried in the conduit are made within the interior of the body. The open top of the body is then closed by a complementary lid or cover secured thereto to enclose the electrical connections therein and prevent the connections from being contacted or damaged. Examples of prior art conduit outlet fittings are shown, for example, in U.S. Pat. Nos. 1,706,811; 2,800,247; 3,394,509; 3,430,799; 3,910,448; 4,699,293; 4,896,784 and 5,147,980.

In some environments, particularly in combustible, corrosive or other hazardous environments, it is advantageous to provide a protective coating on at least all exterior surfaces of metal, typically galvanized steel or aluminum, conduit outlet fittings and all conduit attached thereto. The protective coating can be polyvinyl chloride (PVC) or other polymeric materials. Prior art patents in this area include U.S. Pat. Nos. 3,724,706 and 3,434,900. Robroy Industries, Inc., the assignee of the present application, markets a line of PVC coated conduit outlet fittings, conduit and related products under the PLASTI-BOND RED® trademark. PVC coated conduit outlet fittings, conduit and related products are sold by Occidental Coating Company and Ocal Inc. under the name OCAL-BLUE.

While the prior art coated outlet fittings provide good protection of the product in various hazardous environments, there are several problems with these designs which have not yet been addressed.

In the coated conduit outlet fittings sold by Robroy Industries, Inc., as reflected in U.S. Pat. No. 3,724,706, a seal is provided between the body and the cover attached thereto. The body has an outwardly extending, flat seal formed in the coating material, while the cover has a similarly shaped, outwardly extending, downwardly tapered seal formed in the coating material. While this arrangement provides for an adequate seal or joint between the cover and the body, and a protective seal for the interior of the body, this seal design has a drawback in that under certain circumstances corrosive or other materials can travel past the seal and penetrate between the protective coating and the outer surface of the body or cover and cause corrosion thereof which forces the protective coating to separate from the underlying metal product. In addition, the taper of the cover seal exerts an outward force on the body seal which tends to push the body seal and coating away from the body. While the OCAL-BLUE conduit outlet fitting has a flat seal which extends partially over the body and cover and provides some additional protection for the exterior surfaces beneath the protective coating, it is difficult to consistently manufacture complementary seals on the body and cover to provide a tight seal over the entire periphery of the open top of the body. In addition, it is difficult to properly install and align the coated cover onto the coated body of the OCAL-BLUE product.

Therefore, it is an object of the present invention to provide a coated conduit outlet fitting which minimizes or prevents corrosion between the coating and the underlying metal material. In addition, it is an object of the present invention to provide a coated conduit outlet fitting with a significantly improved seal between the cover and the body. It is a further object of the present invention to provide an improved seal for a coated conduit outlet fitting which also allows the cover to be readily positioned and aligned onto the body so that the cover can be quickly and securely connected to the body.

SUMMARY OF THE INVENTION

My invention relates to a coated conduit outlet fitting which includes a hollow body having an open top, a body flange extending along an upper peripheral edge of the body and around the open top, and at least one conduit opening extending through the body and into an interior thereof. A cover conformed substantially to the open top of the body is configured to be attached to the body and close the body interior. The cover has a cover flange extending along an outer peripheral edge of the cover and configured to abut the body flange. A protective coating is adhered to an exterior surface of the cover and the body. The protective coating on the body is formed into an upwardly oriented body seal which extends at least partially over and is adhered to the body flange. The protective coating on the cover is formed into a downwardly oriented cover seal which extends at least partially over and is adhered to the cover flange. One of the body seal and the cover seal is shaped as a male seal and the other of the body seal and the cover seal is shaped as a female seal. The male seal and female seal are complementary to each other and mating in configuration. The cover seal engages the body seal when the cover is positioned on the body and covers the open top. A fastening means is provided for fastening the cover to the body with the cover seal and the body seal in engagement with each other.

The body seal and cover seal can be formed in a tongue and groove or male and female seal arrangement, such as an inverted V-shaped tongue and groove seal. Preferably, the body seal is formed as an inverted V-shaped tongue seal and the cover seal is formed as an inverted V-shaped groove seal. The body seal preferably has a portion that extends outwardly beyond the upper peripheral edge of the body and the cover seal has a portion that extends outwardly beyond the outer peripheral edge of the cover.

Each conduit opening preferably extends through an associated conduit hub extending outwardly from and attached to the body. The protective coating is adhered to an exterior surface of each conduit hub and extends beyond an outer end thereof to form a sealing sleeve substantially parallel to and axially aligned with a conduit opening therein. The conduit openings are typically internally threaded along at least a portion of their length. At least one threaded fastener can extend through an associated fastener hole in the cover and into an aligned hole in the body. The protective coating on the cover can extend into and cover at least a portion of the internal surface of each fastener hole and hold a threaded fastener to the fastener hole when the cover is separated from the body. The protective coating can be formed of a polymeric material, such as polyvinyl chloride.

I have also developed an apparatus for forming a coated conduit outlet fitting with a male seal and a female seal attached thereto in an area where the cover is affixed to the body. The apparatus includes a tooling plate having the same general outer configuration as an outer peripheral edge of the cover and an upper peripheral edge of the body and positionable between and in contact with the cover and the body. The tooling plate has a first mold formed in a bottom surface thereof and extending along an outer peripheral edge thereof. The tooling plate also has a second mold formed in the top surface thereof and extending along its outer peripheral edge. The first mold is configured to form one of a male seal and a female seal on the upper peripheral edge of the body. The second mold is configured to form the other of a male seal and a female seal on the outer peripheral edge of the cover. The male seal and female seal are complementary to each other and mating in configuration. The apparatus also includes a hanger tooling block affixed to the bottom surface of the tooling plate inward of the first mold and having a hanger attachment means therein. A hanger is configured to pass through a conduit opening through the body and be attached to the hanger attachment means. The hanger carries a cap means for covering an external end of the conduit opening through which the hanger passes. The hanger tooling block is configured to fit within the interior of the body and is positioned on the tooling plate to be aligned with the conduit opening when the tooling plate is positioned against the body and covers the open top thereof. The tooling plate also includes cover attachment means permitting the cover to be attached to the body with a tooling plate positioned therebetween and in contact with the cover and the body, with the first mold aligned with the upper peripheral edge of the body and with the second mold aligned with the outer peripheral edge of the cover.

In a preferred embodiment, the tooling also includes at least one plug tooling block affixed to the bottom surface of the tooling plate inward of the first mold and spaced from the hanger tooling block and having a plug attachment means therein. A plug is configured to pass through another conduit opening through the body and be attached to the plug attachment means. The plug also carries a cap means for covering an external end of the conduit opening through which the plug passes. The plug tooling block is configured to fit within the interior of the body and the hanger tooling block and the plug tooling block are positioned on the tooling plate to be aligned with an associated conduit opening when the tooling plate is positioned against the body and covering its open top.

The first mold is preferably configured to form a tongue seal, such as an inverted V-shaped tongue seal, and the second mold is preferably configured to form a groove seal, such as an inverted V-shaped groove seal.

It is preferred that the tooling plate include a top tooling plate, a middle tooling plate and a bottom tooling plate stacked together and contacting each other. The top tooling plate and bottom tooling plate are each smaller than and fit within the middle tooling plate. The first mold is formed by an outer first mold portion on the lower surface of the middle tooling plate adjacent its outer peripheral edge and an inner first mold portion along an outer peripheral edge of the bottom tooling plate. The second mold is formed by an outer second mold portion on the upper surface of the middle tooling plate adjacent its outer peripheral edge and an inner second mold portion along an outer peripheral edge of the top tooling plate. The outer first mold portion can be an outwardly and downwardly angled surface of the middle tooling plate and the inner first mold portion can be an inwardly and downwardly angled surface of the bottom tooling plate. The outer and inner first mold portions together are configured to form an inverted V-shaped tongue seal. The outer second mold portion can be an inwardly oriented, inverted V-shaped projection of the middle tooling plate and the inner second mold portion can be a vertical outer surface of the top tooling plate, with the outer and inner second mold portions together configured to form an inverted V-shaped groove seal.

The tooling plates, at least adjacent the outer peripheral edges of the top tooling plate and bottom tooling plate, are preferably spaced apart from each other to form at least one air gap therebetween. The spacing between the top and middle tooling plates and the spacing between the middle and bottom tooling plates is preferably in the range of 0.005" to 0.009". The spacing can be formed by at least one raised area extending upwardly from an upper surface of the middle tooling plate in an area thereof spaced inwardly from the outer second mold portion and by at least one raised area extending downwardly from a lower surface of the middle tooling plate in an area thereof spaced inwardly from the outer first mold portion.

The hanger can include an air bleed hole in fluid communication with the interior of the body. The tooling plate can include an air hole in fluid communication with the interior of the body and in fluid communication with the spacing between the tooling plates. The cap means on the hanger and plug can be a cylindrical member carried and positioned thereon to be located adjacent and covering the external end of an associated conduit opening and extending outwardly therefrom when the hanger and plug are attached to the hanger tooling block and plug tooling block, respectively. The inner end of each cylindrical sleeve adjacent the conduit opening can have a beveled outer peripheral edge. In addition, the cylindrical members can be loosely carried on each of the hanger and plug.

I have also developed a method of manufacturing a coated conduit outlet fitting with male and female seals and utilizing the tooling described above. The tooling plate/hanger blocks assembly is positioned on the body with the tooling plate contacting and covering the open top of the body and with the hanger blocks within the body interior and aligned with an associated conduit opening. A hanger and a plug pass through a conduit opening and are connected to a hanger tooling block or plug tooling block, respectively, with the cap means on each covering the external end of a conduit opening. The cover is then attached to the body, with the tooling plate sandwiched therebetween. The assembled structure is handled by the hanger and dipped into a liquid protective coating material to form a coating thereon and to form the male and female seals. The coated assembly is removed from the liquid material and the coating and seals are cured. Thereafter, excess coating material is removed, the cover is separated from the body and the various elements of the tooling are removed from the body.

BRIEF DESCRIPTION OF THE DRAWINGS

FIG. 6 is a section taken along lines VI—VI in FIG. 2;

FIG. 6A is an enlarged sectional view of the circled area in FIG. 6;

FIG. 9 is an exploded transverse section taken through the assembly shown in FIG. 8;

FIG. 10 is a transverse section, similar to FIG. 9, taken through the assembly shown in FIG. 8;

FIG. 12 is a side view of another configuration of the tooling shown in FIG. 11;

FIG. 13 is a side view of a hanger included in the tooling shown in FIGS. 7–12;

FIG. 14 is an exploded perspective view of the hanger shown in FIG. 13;

FIG. 15 is a side view of a plug included in the tooling shown in FIGS. 7–12;

FIG. 16 is a top view of a top tooling plate included in the tooling shown in FIGS. 7–12;

FIG. 17 is a section taken along lines XVII—XVII in FIG. 16;

FIG. 18 is a top view of a middle tooling plate included in the tooling shown in FIGS. 7–12;

FIG. 19 is a section taken along lines XIX—XIX in FIG. 18;

FIG. 20 is a section taken along lines XX—XX in FIG. 18;

FIG. 21 is a top view of a bottom tooling plate included in the tooling shown in FIGS. 7–12;

FIG. 22 is a section taken along lines XXI—XXI in FIG. 21;

FIG. 23 is a longitudinal section showing the assembled tooling and conduit outlet fitting of FIGS. 7 and 8 after coating;

FIG. 23A is an enlarged sectional view of the circled area of FIG. 23; and

FIG. 24 is a section taken along lines XXIV—XXIV in FIG. 23.

DESCRIPTION OF THE PREFERRED EMBODIMENTS

Figure 1:
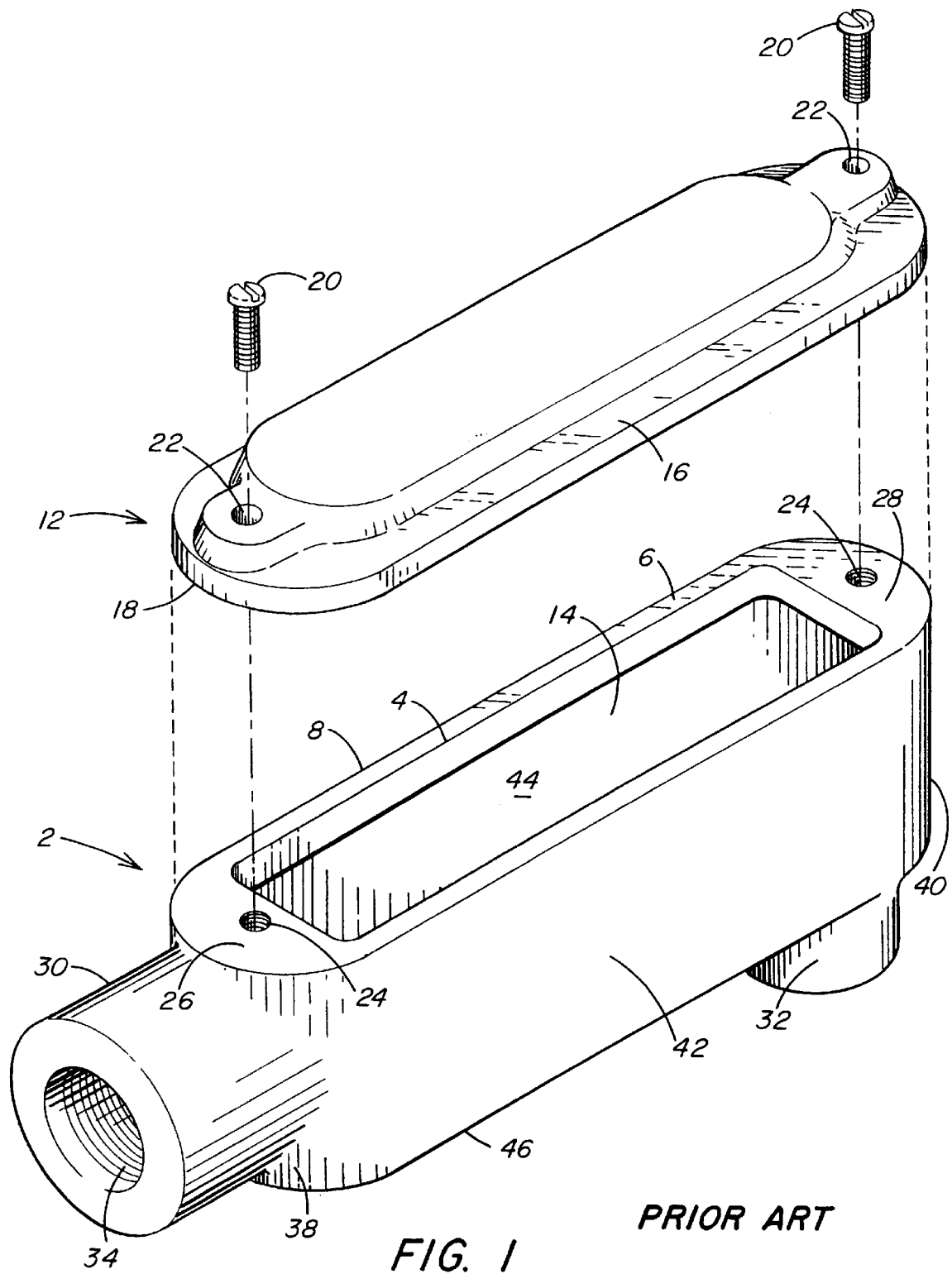
FIG. 1 is an exploded perspective view of a prior art, uncoated conduit outlet fitting including a body and a cover.
Figure 2:
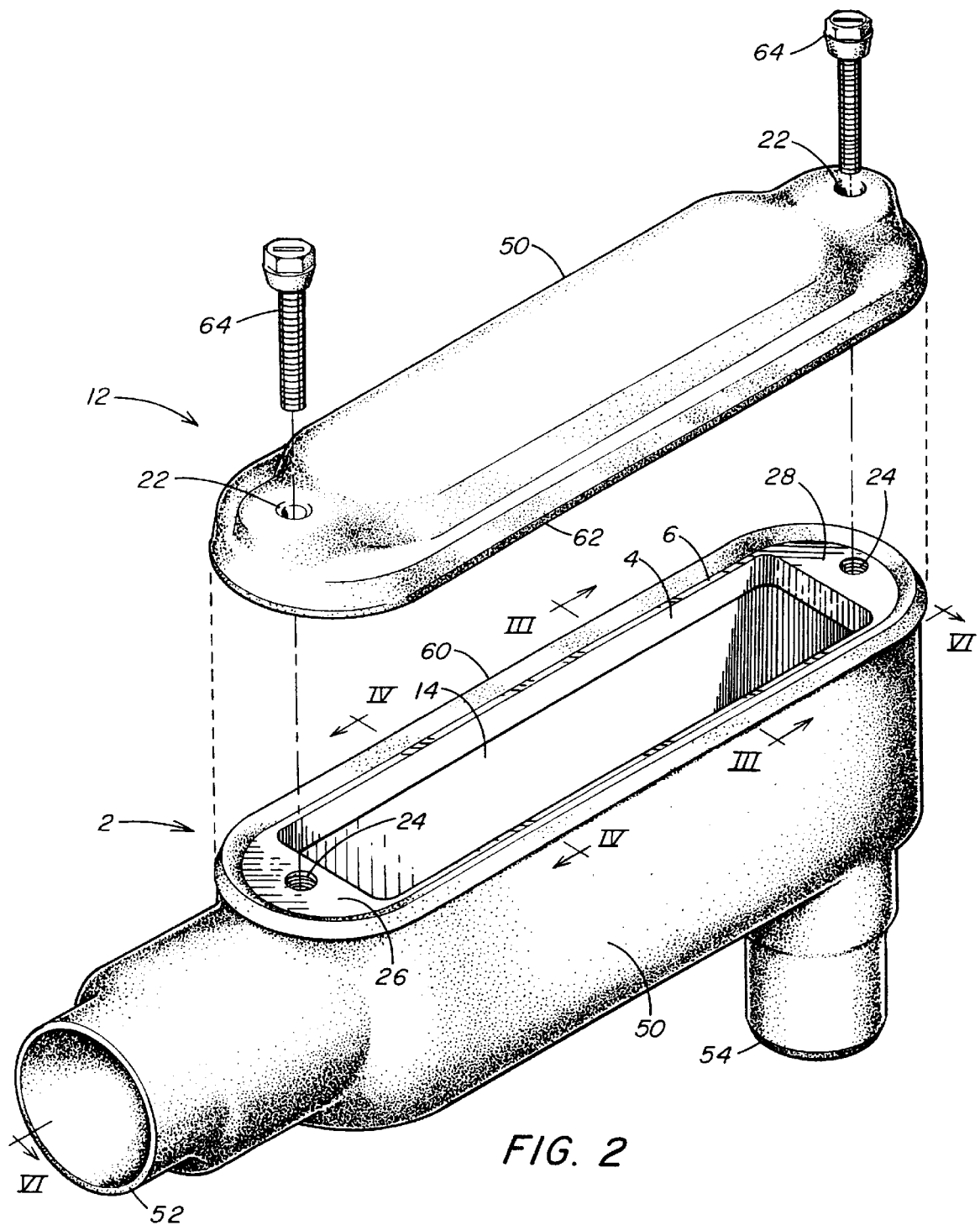
FIG. 2 is an exploded perspective view of the conduit outlet fitting shown in FIG. 1 coated in accordance with the present invention.
Figure 3:
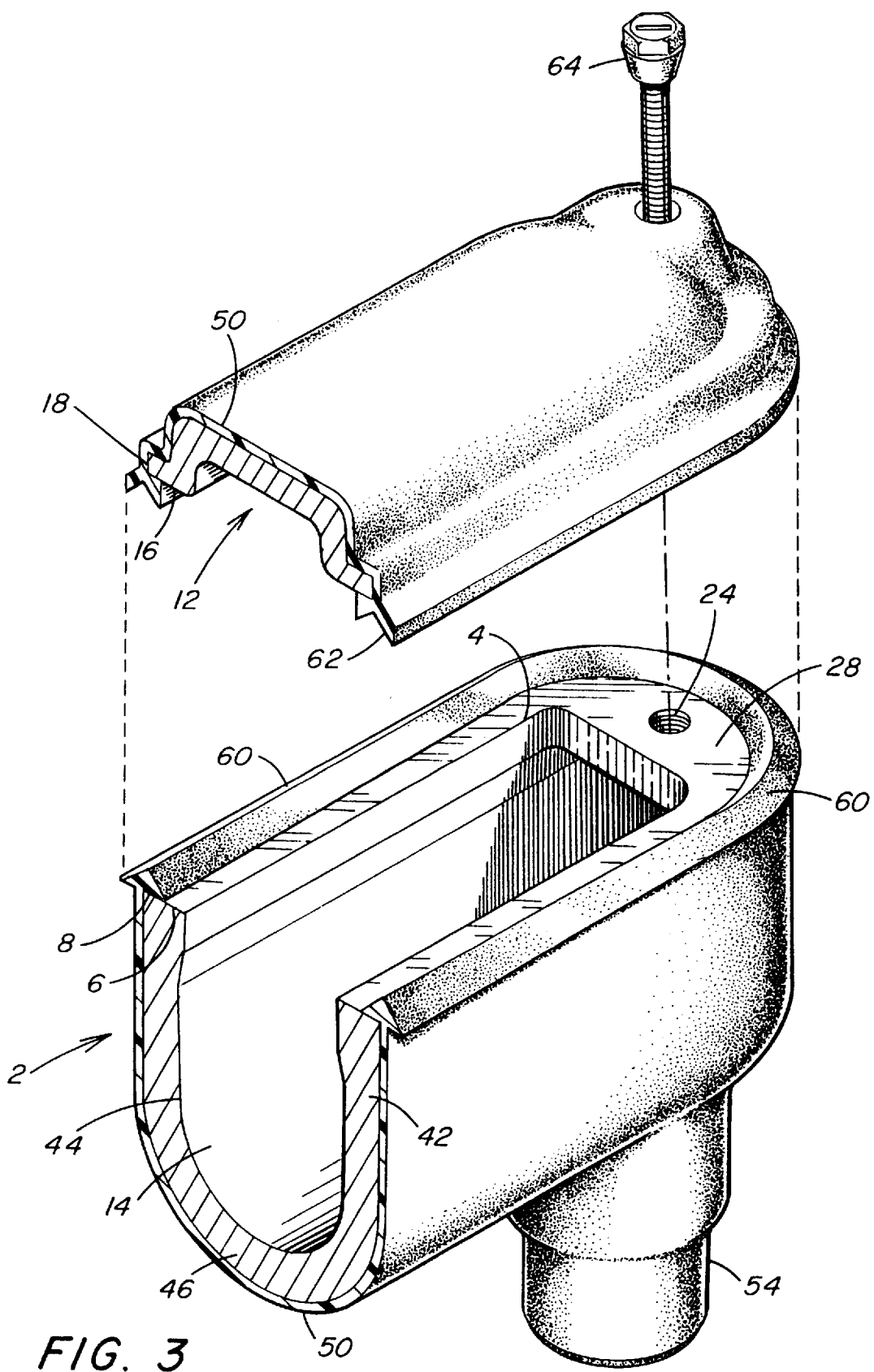
FIG. 3 is a perspective section taken along lines III—III in FIG. 2.
Figure 5:
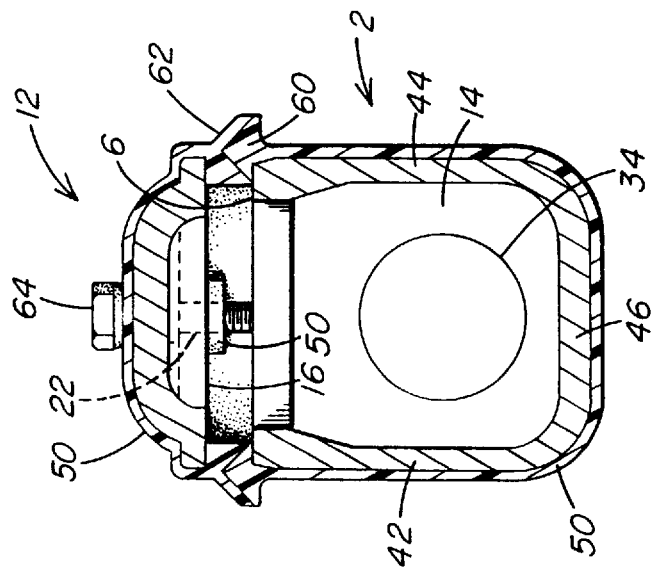
FIG. 5 is a section similar to FIG. 4, but with the cover secured to the body.
Figure 4:
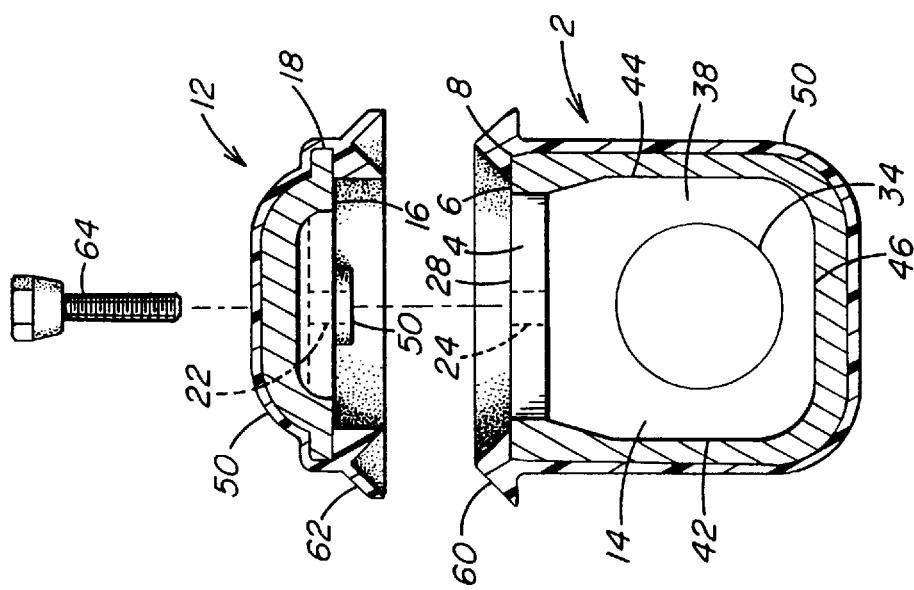
FIG. 4 is a section taken along lines IV—IV in FIG. 2.

One example of a known conduit outlet fitting, which can be coated in accordance with the present invention, is shown in FIG. 1. The outlet fitting includes a hollow body 2 having an open top 4 and a body flange 6 extending inwardly along an upper peripheral edge 8 of the body 2 and around the open top 4. In this example the body 2 is shown as an oblong, box-like shape, but other configurations are used as is well known. The outlet fitting also includes a cover 12 which conforms substantially to the open top 4 of the body 2 and is configured to be attached to the body 2 and enclose the interior 14 of the body 2. The cover 12 has a cover flange 16 extending along an outer peripheral edge 18 of the cover 12 and configured to abut and sit securely on the body flange 6. Mounting screws 20 or other fasteners pass through associated fastener holes 22 in the cover 12 and into threaded holes 24 cut at opposite and widened ends 26 and 28 of the body flange 6. The body 2 shown in FIG. 1 has two cylindrical, elongated, internally threaded, conduit coupling members, also referred to as conduit hubs 30 and 32, which carry therein conduit openings 34 and 36 to the interior 14 of the body 2. The conduit openings 34 and 36 are configured to threadably receive electrical conductor-carrying conduit pipe for bringing the conductors into the interior 14 of the body 2. Conduit opening 36 is not visible in FIG. 1, but is shown clearly in later figures. The conduit openings 34 and 36 are shown as internally threaded for at least a portion of their length, which is typical, but other arrangements are also known. Although the conduit openings 34 and 36 could be cut and threaded directly through the body 2, the use of such elongated hubs is common and provides additional strength to the final structure. While the conduit hubs 30 and 32 can be provided at any location on the body 2, including each of the opposed ends 38 and 40, opposed sides 42 and 44, and bottom 46, in the configuration shown in FIG. 1, conduit hub 30, carrying conduit opening 34, is provided at end 38 of the body 2, while conduit hub 32 carrying conduit opening 36 is provided on the bottom 46 of the body 2, spaced from conduit hub 30 and positioned adjacent end 40 of the body 2. The arrangement shown in FIG. 1 is referred to in the trade as the "LB" type conduit fitting. The body 2 and cover 12 of the conduit outlet fitting are commonly made of cast iron and electrogalvanized.

The conduit outlet fitting of FIG. 1, which has been coated in accordance with the present invention, is shown in FIGS. 2–6. A protective coating 50 is provided on and adhered to all of the exterior surfaces of the body 2 and cover 12, including conduit hub 30 and conduit hub 32. The coating 50 is made from a moldable, corrosion resistant polymeric material. The coating is preferably a flexible, durable, chemical resistant, impact resistant polymer such as polyvinyl chloride (PVC). Impact resistant nylon, polypropylene, polyurethane or polyethylene can also be used for the coating 50, although PVC is preferred. The coating 50 can be on the order of 0.040" thick on the exterior surfaces of the body 2, cover 12 and conduit hubs 30 and 32, other than as discussed below. The coating 50 is formed into sealing sleeves 52 and 54 which extend beyond the outer ends 56 and 58 of the conduit openings 34 and 36 in the conduit hubs 30 and 32, respectively, and form corrosion resistant and sealing sleeves for a conduit threaded into the conduit hubs 30 and 32. The sealing sleeves 52 and 54 are substantially parallel to and axially aligned with an associated conduit opening 34 and 36, respectively.

In accordance with the present invention, the coating 50 on the body 2 is formed into an upwardly oriented body seal 60 which extends at least partially over and is adhered to the body flange 6. Similarly, the coating 50 on the cover 12 is formed into a downwardly oriented cover seal 62 which extends at least partially over and is adhered to the cover flange 16. In general, one of the body seal 60 and the cover seal 62 is shaped as a male seal and the other of the body seal 60 and cover seal 62 is shaped as a female seal. The body seal 60 and the cover seal 62 are complementary to each other and mating in configuration. In this manner, the cover seal 62 can engage the body seal 60 when the cover 12 is positioned on the body 2 and covers the open top 4 of the body 2.

In a preferred arrangement, the body seal 60 and the cover seal 62 are formed in a tongue and groove seal arrangement, most preferably in an inverted V-shaped tongue and groove seal arrangement, with the tongue seal provided as the body seal 60 and the groove seal provided as the lid cover seal 62. As shown more clearly in FIGS. 4–6, the body seal 60 is formed as an inverted V-shaped tongue member which extends inwardly at least partially over the body flange 6 and with a portion extending outwardly beyond the upper peripheral edge 8 of the body 2. In addition, the body seal 60 extends upwardly above the surface of the body flange 6 to a sufficient height. Similarly, the cover seal 62 is formed as an inverted V-shaped groove member which extends inwardly at least partially over the cover flange 16 and with a portion extending outwardly beyond the outer peripheral edge 18 of the cover 12. The cover seal 62 extends downwardly below the surface of the cover flange 16 for a sufficient height. The height of the tongue of the body seal 60 and corresponding depth of the groove of the cover seal 62 should be sufficient to provide enough compression between the seals 60 and 62 when the cover 12 is positioned on the body 2 and provide a liquid and airtight seal for the interior 14 of the body 2. Through this mating tongue and groove seal arrangement, the cover 12 can be precisely and readily positioned on the body 2 with the fastener holes 22 in the cover 12 aligned with the threaded holes 24 in the body 2. It is common to use the encapsulated screws 64 shown in FIGS. 2–6 to attach a coated cover 12 to a coated body 2 of a coated conduit outlet fitting.

As shown in FIG. 6, and more particularly in FIG. 6A, the lower end of each fastener hole 22 in the cover 12 can be provided with a wider, flared area 66. In the embodiment shown therein, the coating 50 on the cover 12 extends into flared area 66 and extends slightly downward therefrom. In addition, the coating 50 extends at least partially along the fastener holes 22 in the cover 12 as shown. This presence of the coating 50 in flared areas 66 and fastener holes 22 functions to retain the threaded screws 20 or encapsulated screws 64 in the fastener holes 22 and to the cover 12 when the cover 12 is separated from the body 2 and minimizes the chance of the threaded screws 20 or encapsulated screws 20 becoming lost or separated therefrom.

Figure 7:
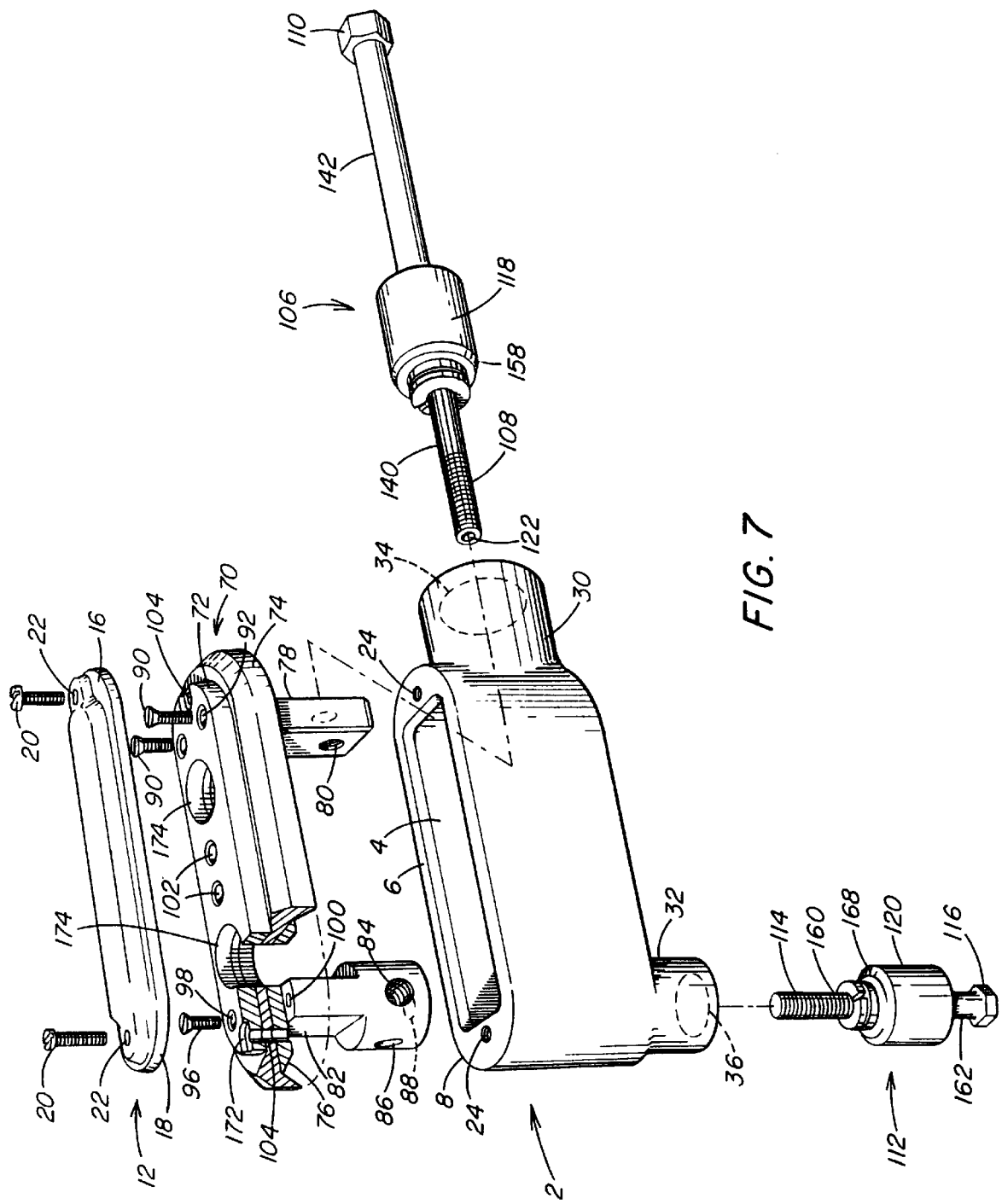
FIG. 7 is an exploded perspective view, partially cut away, of the tooling used to make the coated conduit outlet fitting shown in FIGS. 2–6 and being inserted into the uncoated conduit outlet fitting shown in FIG. 1.
Figure 8:
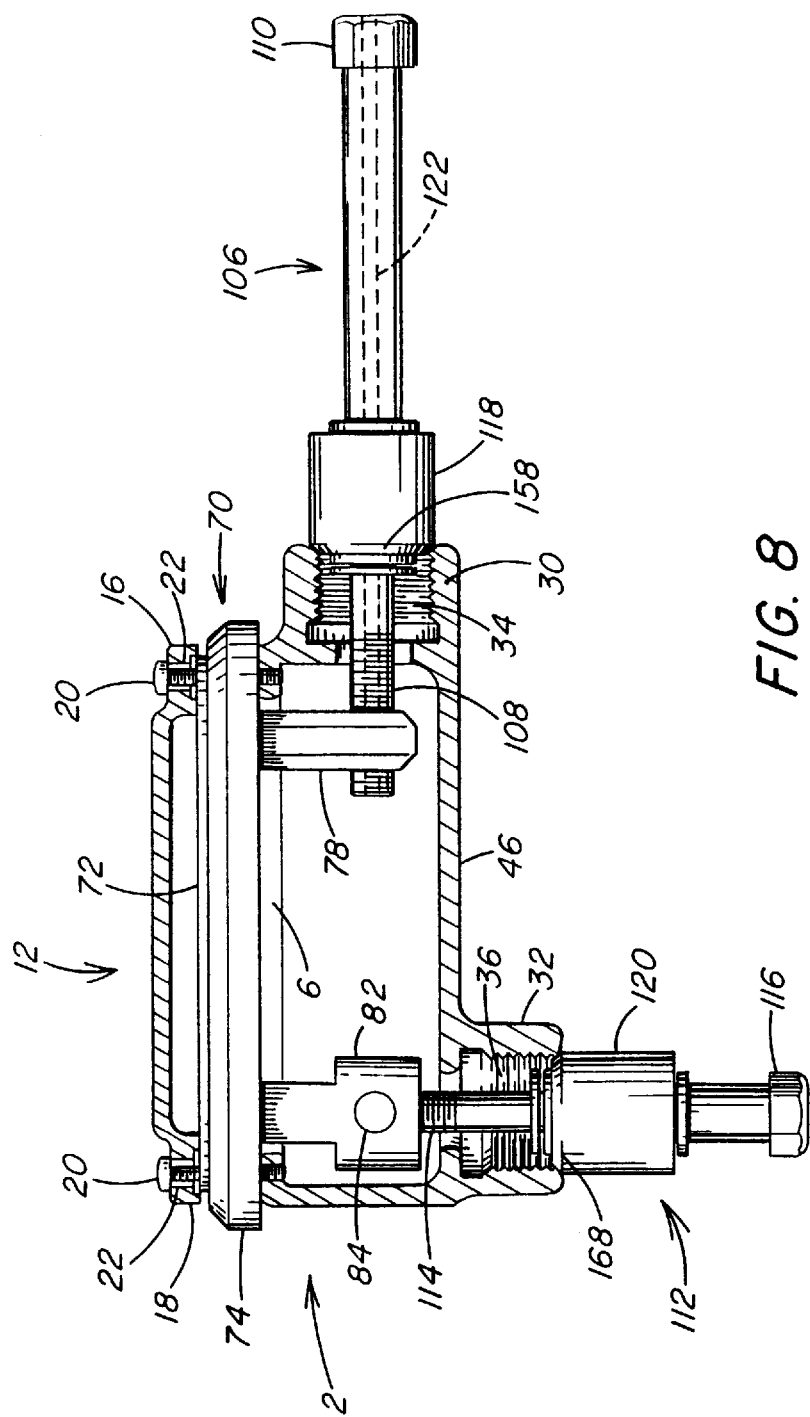
FIG. 8 is a longitudinal section taken through the uncoated conduit outlet fitting shown in FIG. 7 with the tooling in an assembled configuration.
Figure 11:
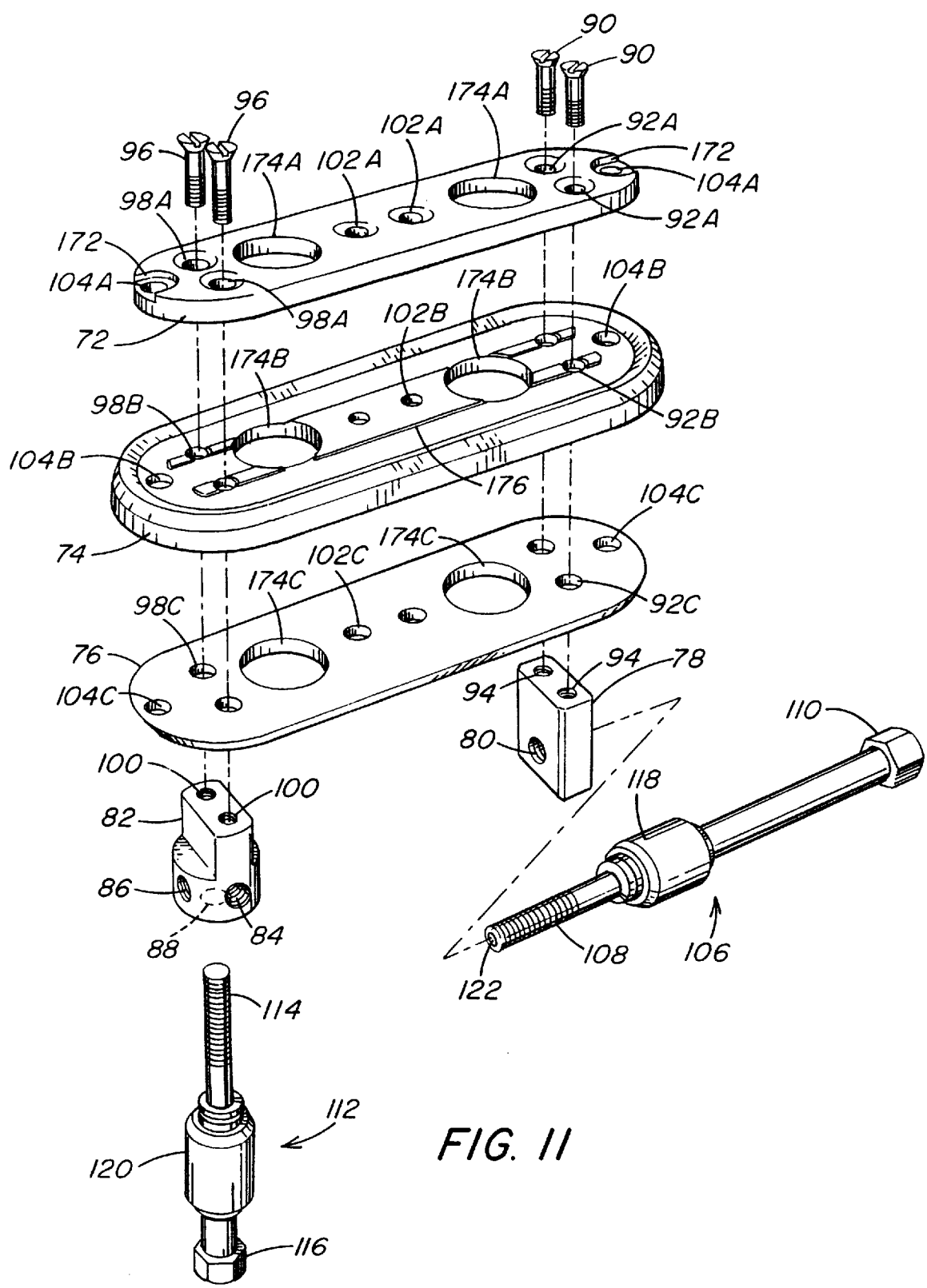
FIG. 11 is an exploded perspective view of the tooling shown in FIG. 7.

One embodiment of a tooling which is suitable for manufacturing the coated conduit outlet fitting with the male and female or tongue and groove seal discussed above is shown in FIGS. 7–24. FIGS. 7 and 8 show the relationship of the tooling to the uncoated conduit outlet fitting. FIGS. 9–22 show the various elements of the tooling per se. FIGS. 23–24 show the relationship of the tooling to an initially coated and untrimmed conduit outlet fitting.

Referring initially to FIGS. 7–11, the tooling includes a tooling plate 70 having the same general outer configuration as the outer peripheral edge 18 of the cover 12 and the upper peripheral edge 8 of the body 2, but slightly larger in dimension. The tooling plate 70 is preferably formed from a top tooling plate 72, a middle tooling plate 74 and a bottom tooling plate 76 which are stacked on and in contact with each other. The top tooling plate 72 and bottom tooling plate 76 are slightly smaller than and fit within the wider middle tooling plate 74. The tooling plates are stacked with the bottom surface of the top tooling plate 72 in contact with the top surface of the middle tooling plate 74 and with the top surface of the bottom tooling plate 76 in contact with the bottom surface of the middle tooling plate 74.

A hanger tooling block 78 is affixed to the bottom surface of the tooling plate 70, i.e., the bottom surface of the bottom tooling plate 76, and has a hanger attachment means, such as threaded hole 80, therein. A plug tooling block 82, spaced from the hanger tooling block 78, is affixed to the bottom surface of the tooling plate 70. Similarly, the plug tooling block 82 has a plug attachment means, such as a pair of horizontal threaded holes 84 and 86, arranged at about 90° to each other, and a vertical threaded hole 88 extending axially therein. A pair of mounting screws 90 pass through holes 92A, 92B and 92C in the top tooling plate 72, middle tooling plate 74 and bottom tooling plate 76, respectively, and into threaded mounting holes 94 in the top of the hanger tooling block 78. Similarly, a pair of mounting screws 96 pass through holes 98A, 98B and 98C in the top tooling plate 72, middle tooling plate 74 and bottom tooling plate 76, respectively, and into threaded mounting holes 100 in the top of the plug tooling block 82. Additional sets of holes, such as holes 102A, 102B and 102C as shown, can be provided in the tooling plate 70 if it is desired to attach an additional plug tooling block 82 to the tooling plate 70 or to move the hanger tooling block 78 to other locations on the tooling plate 70. The upper ends of holes 92A, 98A and 102A at the upper surface of the top tooling plate 72 can be countersunk to accept the heads of screws passing therethrough and provide a flush upper surface to the top tooling plate 72.

As shown more particularly in FIGS. 7 and 8, the tooling plate 70 is positioned above the open top 4 of the body 2, with its lower surface in contact with the body 2 and with the plug tooling block 82 and hanger tooling block 78 both positioned within the interior 14 of the body 2. The hanger tooling block 78 is aligned with conduit opening 34 and conduit hub 30 in the body 2, while the plug tooling block 82 is aligned with conduit opening 36 and conduit hub 32 in the body 2. The cover 12 is positioned above and in contact with the upper surface of the tooling plate 70. Screws 20 pass through the fastener holes 22 in the cover 12, through aligned holes 104A, 104B and 104C in the top tooling plate 72, middle tooling plate 74 and bottom tooling plate 76, respectively, and into threaded holes 24 in the body flange 6 of the body 2. In this manner, the tooling plate 70 is securely attached to the body 2 and sandwiched between the body 2 and the cover 12.

A hanger 106 having interior threaded end 108 and nut 110 on an exterior end is passed through conduit opening 34 and hub 30 and is threaded into hole 80 in the hanger tooling block 78 and attached thereto. Similarly, a plug 112 having interior threaded end 114 and nut 116 on an exterior end is passed through conduit opening 36 and hub 32 and is threaded into hole 88 in the plug tooling block 82 and attached thereto. The hanger 106 carries a cap means, here cylindrical sleeve 118, for covering the outer end 56 of conduit opening 34. Similarly, the plug 112 has a cylindrical sleeve 120 thereon for covering the outer end 58 of conduit opening 36. An air bleed hole 122 extends axially through the entire length of the hanger 106, from threaded end 108 to nut 110. An air bleed hole is specifically not included in the plug 112.

An important feature of the tooling plate 70 of the present invention is that molds are formed along its outer peripheral edge to form the male and female or tongue and groove seals discussed above as the body seal 60 and cover seal 62. Referring particularly to FIGS. 9 and 10, the tooling plate 70 has a first mold 124 formed in a bottom surface thereof and extending along its outer peripheral edge 126. In addition, the tooling plate 70 has a second mold 128 formed in a top surface thereof and extending along its outer peripheral edge 126. Although either of the first mold 124 and second mold 128 can be configured in the male or female, or tongue or groove, configurations, the preferred arrangement includes the first mold 124 formed in the shape of the male or tongue configuration, and the second mold 128 formed in the shape of the female or groove configuration. It is preferred that the first mold 124 and second mold 128 form an inverted V-shaped tongue and groove configuration discussed above. The hanger tooling block 78 and plug tooling block 82 are preferably attached to the tooling plate 70 inwardly of the first mold 124 so as to not interfere with its function.

While the first mold 124 and second mold 128 could be formed in a solid, one-piece tooling plate 70, the use of separate and stacked top tooling plate 72, middle tooling plate 74 and bottom tooling plate 76 to form the tooling plate 70 is preferred not only for manufacturing convenience, but also for certain advantages in the molding process itself. The middle tooling plate 74 has a central region 130 with flat upper and lower surfaces. An outer mold portion of the first mold 124 is provided by an outwardly and downwardly angled surface 132 of the middle tooling plate 74 on its lower surface adjacent its outer peripheral edge. Similarly, an outer mold portion of the second mold 128 is provided by an upwardly oriented, inverted V-shaped projection 134 of the middle tooling plate 74 on its upper surface and adjacent its outer peripheral edge. The bottom tooling plate 76 has substantially flat upper and lower surfaces. An inner mold portion of the first mold 124 is provided by an inwardly and downwardly angled surface 136 on the outer peripheral edge of the bottom tooling plate 76. When the bottom tooling plate 76 is positioned immediately adjacent the middle tooling plate 74, the first outer mold portion 132 and the first inner mold portion 136 are aligned with each other to form the inverted V-shaped first mold 124 of the tooling plate 70, which forms the tongue shaped body seal 60. The slope and height of the angled surface 132 on the middle tooling plate 74 are similar to the height and slope of the angled surface 136 on the bottom tooling plate 76, although they are mirror images of each other. The top tooling plate 72 has substantially flat upper and lower surfaces and a substantially vertical and flat outer peripheral edge. The outer peripheral edge of the top tooling plate 72 forms an inner second mold portion 138. When the top tooling plate 72 is positioned immediately adjacent the middle tooling plate 74, the second outer mold portion 134 and the second inner mold portion 138 are aligned with each other to form the inverted V-shaped second mold 128 of the tooling plate 70, which forms the groove shaped cover seal 62.

The thickness of the top tooling plate 72, i.e., the height of the outer peripheral edge or inner second mold portion 138, is higher than the peak of the outer second mold portion 134 along the outer peripheral edge 126 of the middle tooling plate 74. This difference in height is necessary to provide space above the peak of the outer second mold portion 134 so that sufficient coating material can be included in the cover seal 62 for strength and durability, and to make both sides of the inverted V-shaped groove portion of the cover seal 62 integral and strongly attached to each other.

FIG. 12 shows alternate arrangements which can be provided using the tooling discussed above. Similar to the arrangement shown in FIGS. 7–11, the tooling plate 70 includes a hanger tooling block 78 attached at one end and a hanger 106 attached thereto by hole 80. Plug tooling block 82 is attached to the tooling plate 70 at an end thereof opposite to the hanger tooling block 78. An additional plug tooling block 82A is attached to the tooling plate 70 at a bottom surface thereof using holes 102 which had not been used in the FIGS. 7–11 arrangement. Plug tooling block 82A is oriented 90° from the orientation of plug tooling block 82. Plug 112 is attached to plug tooling block 82 at horizontal hole 86 and plug 112A is attached to plug tooling block 82A at vertical hole 88A. FIG. 12 shows how plugs 112 and 112A can be attached to an associated plug tooling block 112 and 112A at various orientations. The precise arrangement utilized will be dictated by the nature of the configuration of the conduit outlet fitting which is being coated using the tooling of the present invention. FIG. 12 is intended to show the versatility of the basic structure of the tooling shown in FIGS. 7–11. In addition, FIG. 12 shows how the physical appearance of the hanger 106 and hanger tooling block 78 are quite distinct from the physical appearance of the plug 112 and plug tooling block 82. In order to make sure that workers assembling the tooling to the conduit fitting use one hanger 106 for one of the conduit outlets, and use a plug 112 for the remaining conduit outlets, the various elements are physically distinct from one another. The hanger 106 is significantly longer than the shorter plug 112. The hanger tooling block 78 is more flat in appearance than the mostly round plug tooling block 82. Although the plug 112 and hanger 106 function in the same manner to close off the conduit outlets and provide a means for forming sealing sleeves around the conduit outlets, it is necessary to use only one hanger 106 in the manufacturing process. These visual differences will help to insure that this goal is accomplished during the manufacturing process.

The construction of the hanger 106 and plug 112 is shown in more detail in FIGS. 13–15. The hanger 106 includes an elongated bolt having a narrow bolt portion 140 attached to a wider bolt portion 142 and forming a shoulder 144 therebetween. The narrow bolt portion 140 has threaded end 108 opposite the shoulder 144. The wider bolt portion 142 has threaded end 146 opposite the shoulder 144 which holds nut 116 threaded and welded thereto. The cylindrical sleeve 118 has an inner bore 148 with an internal diameter larger than the outer diameter of the narrow bolt portion 140 and is carried on the narrow bolt portion 140 near the shoulder 144. Washer 150 is positioned on the narrow bolt portion 140 between one end of the sleeve 118 and the shoulder 144 and washer 152 is positioned on the narrow bolt portion 140 on the opposite end of the sleeve 118. The washers 150 and 152 have an internal bore slightly larger than the outer diameter of the narrow bolt portion 140 and smaller than the outer diameter of the wider bolt portion 142. A retaining ring 154 is snapped into a retaining ring groove 156 in the narrow bolt portion 140 and holds the sleeve 118 and washers 150, 152 securely thereon. The peripheral edge 158 of the sleeve 118 adjacent the retaining ring 154 and toward threaded end 114 is inwardly beveled. By this arrangement, the sleeve 118 is securely held in place on the hanger 106, but the sleeve 118 can move laterally somewhat about the narrow bolt portion 140 from the spacing therebetween due to the difference between the outer diameter of the narrow bolt portion 140 and the inner diameter of the inner bore 148 through the sleeve 118. This arrangement permits the sleeve 118 to move about and always be securely positioned with the beveled edge 158 tightly adjacent and contacting an outer thread of a threaded conduit opening through the body 2. This arrangement is a distinct improvement over prior art arrangements which threaded a hanger directly into the conduit opening, with damage to the threads or any protective coating thereon. It also eliminates the need for inspection and touch-up of thread coat damage. By the arrangement of the present invention, the threads of the conduit openings are never contacted because the narrow bolt portion 140 of the hanger 106 passes through a threaded opening and is spaced therefrom. The only contact between the conduit opening and the hanger 106 is where the beveled edge 158 of sleeve 118 contacts an outermost thread and closes the conduit opening. This feature is shown in FIGS. 8 and 23.

Similar to the hanger 106, the plug 112 includes a narrow bolt portion 160 having threaded end 114, a wider bolt portion 162 having nut 116 attached thereto, washers 164 and 166, sleeve 120 with beveled edge 168, and retaining ring 170. One significant difference between the hanger 106 and the plug 112 is that the length of the wider bolt portion is significantly shorter in the plug 112 than in the hanger 106. That is because the plug 112 need only close off a conduit opening while the hanger 106 is used both to close off a conduit opening and hang an assembled tooling/conduit outlet fitting for coating. In addition, the hanger 106 has an air bleed hole extending axially through the narrow bolt portion 140 and wider bolt portion 142 while the plug 112 has no such air bleed hole.

The top tooling plate 72, middle tooling plate 74 and bottom tooling plate 76 are shown in more detail in FIGS. 16–22. Many of the features of the tooling plates were discussed above and will not be repeated here. The top surface of the top tooling plate 72 has a recess 172 therein surrounding the upper end of each of holes 104A therein and extending inwardly from and in fluid communication with the second inner mold portion 138 defined by the outer peripheral edge of the top tooling plate 72. A pair of aligned bores 174A, 174B and 174C are provided through the top tooling plate 72, middle tooling plate 74 and bottom tooling plate 76, respectively. Bores 174 help to reduce the physical mass of the tooling plate 70, which would tend to increase the heat needed in a curing process for the coated product, and also provide a means for easily handling the assembled tooling of the present invention.

FIGS. 19 and 20 show more clearly the relationship of the middle tooling plate 74 to the top tooling plate 72 and bottom tooling plate 76 in forming the first mold 124 and second mold 128 in the tooling plate 70. In addition, FIGS. 18–20 show thin raised areas 176 provided on the upper surface of the middle tooling plate 74 in the central region 130 where the top tooling plate 72 contacts the middle tooling plate 74. FIGS. 19 and 20 show thin raised areas 178 provided on the lower surface of the middle tooling plate 74 in the central region 130 where the bottom tooling plate 76 contacts the middle tooling plate 74. Raised areas 176 and 178 are spaced inwardly from the outer peripheral edges of the top tooling plate 72 and bottom tooling plate 76 and extend substantially laterally along the length thereof. The raised areas 176 and 178 are provided in a height of between 0.005" and 0.009", preferably about 0.007". The raised areas 176 and 178 provide an air spacing between the top tooling plate 72 and middle tooling plate 74, and between the middle tooling plate 74 and bottom tooling plate 76 which is in fluid communication with the adjacent second mold 128 and first mold 124, respectively. The air spacings are also in fluid communication with bores 174. The spacing is small enough to prevent the liquid coating material from flowing therein and forming a flash, yet large enough to allow air flows therein. When the assembled structure shown in FIG. 8 is dipped into the liquid coating material, any excess air contained in the areas of the first mold 124 or second mold 128 will be forced into the spacing within the tooling plate 70 and either expelled directly therefrom or pass through bores 174 in the tooling plate 70, into the interior 14 of the body 2, and out through the air bleed hole 122 in the hanger 106. The heated and expanding air in the interior 14 of the body is also expelled through the air bleed hole 122 in the hanger 106. In this manner, a molded seal can be formed without air pockets or other deformities and provide a much better product.

A method of manufacturing the coated conduit outlet of the present invention is shown with reference to FIGS. 23–24 as well as to the remaining figures. The body 2 and cover 12 are cleaned and primed. The tooling plate 70, tooling blocks 78 and 82, hanger 106 and plug 112 are assembled and positioned in the body 2 and the cover 12 is attached thereto as discussed above and as shown in final form in FIG. 8. Thereafter, the assembled configuration is dipped into a vat of hot, liquid coating material by use of the hanger 106. The coating material forms an even coating on the entire outer surface of the cover 12, body 2 and plug 112 and on only that portion of the hanger 106 actually dipped into the coating material. The coating material flows into the first mold 124 and second mold 128 defined by the tooling plate 70 and its relationship with the body 2 and cover 12. In addition, the coating material flows into the recess 172 in the top tooling plate 72 and into fastener hole 22 for its entire length in the cover 12 and into hole 104A for a portion of its length in the top tooling plate 72. This is shown in more detail in FIG. 23A. The coated product is then withdrawn from the vat of coating material and passed through a curing oven. After the coated product is cured and cooled, it has the configuration shown in FIGS. 23 and 24. To form the final product shown in FIGS. 2–6, the excess coating material is trimmed from around the heads of screws 20, the outer peripheral edge 126 of the tooling plate 70 and the outer peripheral edge of sleeves 118 and 120, as indicated in FIGS. 23 and 24. The screws 20 are removed and the coated cover 12 is removed from the tooling plate 70 and the body 2, the hanger 106 and plug 112 are removed from their associated hanger tooling block 78 and plug tooling block 82 and from the body 2, and the assembly of the tooling plate 70 and hanger blocks 78 and 82 is removed from the body 2. The coating material which flowed into hole 104A is removed below the area defined by recess 172. Although additional rough edges of the trimmed product can thereafter be smoothed out to provide a better looking final appearance, the product at this stage essentially looks like that shown in FIGS. 2–6.

The coated conduit outlet fitting of the present invention has several advantages over prior art arrangements. The body seal 60 and cover seal 62 provide a good, tight seal when the cover 12 is attached to the body 2. The coating 50 does not peel away from the body 2 or cover 12 because of the compressive seal and because the body seal 60 and cover seal 62 overlap their respective body flange 6 and cover flange 16. The inverted V-shaped tongue and groove seals permit the cover 12 to be quickly and precisely affixed to the body 2 with the seals 60 and 62 in proper alignment and with the fastener holes 22 in the cover 12 in proper alignment with the threaded holes 24 in the body 2. The height of the seal, i.e., the area between the body 2 and cover 12 taken by the body seal 60 and cover seal 62, adds more interior wiring space in the conduit outlet fitting. The flexible nature of the seal, as determined by the coating material utilized, will form a compression seal which provides a tight attachment between the cover 12 and body 2 without the need for high torque on the encapsulated screws 64 or other fasteners attaching the cover 12 to the body 2. Hand tightening of such fasteners is often sufficient. The tooling of the present invention provides a mechanism for readily manufacturing the coated conduit outlet fitting with the body seal 60 and cover seal 62. The tooling can be easily used on a variety of shapes and configurations of outlet fittings with standard and interchangeable tooling parts. The tooling readily lends itself to mass manufacturing of the product in large or batch quantities.

Having described above the presently preferred embodiments of the present invention, it is to be understood that the invention may be otherwise embodied within the scope of the appended claims.

I claim:

1. A method of forming a coating on a conduit outlet fitting, the fitting including a cover which is affixed to a hollow body and covers an open top of the hollow body, and the coating including a male seal and a female seal between the hollow body and the cover, the method comprising the steps of:

a) providing a tooling plate having a bottom surface, a top surface, a first mold extending around a peripheral edge of the bottom surface and a second mold extending around a peripheral edge of the top surface;

b) positioning the tooling plate on the hollow body so that the bottom surface of the tooling plate abuts the hollow body around the open top;

c) positioning the cover on the tooling plate so that the cover abuts the top surface of the tooling plate;

d) securing the cover, the tooling plate and the hollow body together to form an assembled structure;

e) dipping the assembled structure into a liquid protective coating material;

f) removing the dip-coated structure from the coating material;

g) curing the coating;

h) removing the coating material between the peripheral edge of the bottom surface of the tooling plate and the peripheral edge of the top surface of the tooling plate; and i) separating the dip-coated cover, the tooling plate and the dip-coated hollow body, wherein:

the coating material received in the first mold forms one of the male seal and the female seal;

the coating material received in the second mold forms the other of the male seal and the female seal; and the male seal and the female seal are positioned complimentary to each other and in mating configuration.

2. The method as set forth in claim 1, further including the steps of:

affixing to the bottom surface of the tooling plate a hanger tooling block and a plug tooling block;

positioning the hanger tooling block and the plug tooling block in the hollow body when the tooling plate is positioned on the hollow body;

inserting a hanger having a hanger cap thereon through a first conduit opening in the hollow body;

securing the hanger to the hanger tooling block with the hanger cap covering an external end of the first conduit opening;

inserting a plug having a plug cap thereon through a second conduit opening in the hollow body; and securing the plug to the plug tooling block with the plug cap covering an external end of the second conduit opening.

3. The method as set forth in claim 2, further including the steps of:

removing from the dip-coated hollow body the hanger, the hanger cap, the plug and the plug cap; and separating the hanger tooling block and the plug tooling block from the tooling plate.

4. The method as set forth in claim 2, further including an air bleed hole extending lengthwise through the hanger and in fluid communication with an interior of the hollow body.

5. The method as set forth in claim 1, wherein the first mold and the second mold are configured to form an inverted V-shaped tongue seal and an inverted V-shaped groove seal, respectively.

6. The method as set forth in claim 1, wherein the tooling plate includes a top tooling plate, a middle tooling plate and a bottom tooling plate stacked together and contacting each other, with the top tooling plate and the bottom tooling plate smaller than and fitting within the middle tooling plate, with the first mold formed by an outer first mold portion on a lower surface of the middle tooling plate adjacent its outer peripheral edge and an inner first mold portion along an outer peripheral edge of the bottom tooling plate, and with the second mold formed by an outer second mold portion on an upper surface of the middle tooling plate adjacent its outer peripheral edge and an inner second mold portion along an outer peripheral edge of the top tooling plate.

7. The method as set forth in claim 6, wherein:

the outer first mold portion is an outwardly and downwardly angled surface of the middle tooling plate;

the inner first mold portion is an inwardly and downwardly angled surface of the bottom tooling plate;

the outer and inner first mold portions together are configured to form an inverted V-shaped tongue seal;

the outer second mold portion is an upwardly oriented, inverted V-shaped projection of the middle tooling plate;

the inner second mold portion is a vertical outer surface of the top tooling plate; and the outer and inner second mold portions together are configured to form an inverted V-shaped groove seal.

8. The method as set forth in claim 6, wherein the tooling plates, at least adjacent the outer peripheral edges of the top plate and the bottom plate, are spaced apart from each other to form at least one air gap therebetween.

9. The method as set forth in claim 8, further including an air hole extending through the tooling plate and in fluid communication with an interior of the hollow body, in fluid communication with the spacing between the top tooling plate and the middle tooling plate, and in fluid communication with the spacing between the middle tooling plate and the bottom tooling plate.

10. A method of using a tooling plate having a bottom surface, a top surface, a first mold extending around a peripheral edge of the bottom surface and a second mold extending around a peripheral edge of the top surface to form a male seal and a female seal between a cover and a hollow body of a conduit outlet fitting, with the cover affixable to the hollow body and covering an open top thereof, the method comprising the steps of:

a) positioning the tooling plate between the hollow body and cover so that the bottom surface of the tooling plate abuts the hollow body around the open top and the cover abuts the top surface of the tooling plate;

b) securing the cover, the tooling plate and the hollow body together to form an assembled structure;

c) dipping the assembled structure into a liquid protective coating material;

d) removing the dip-coated structure from the coating material;

e) curing the coating;

f) removing the coating material between the peripheral edge of the bottom surface of the tooling plate and the peripheral edge of the top surface of the tooling plate; and g) separating the dip-coated cover, the tooling plate and the dip-coated hollow body, wherein:

the coating material received in the first mold forms one of the male seal and the female seal;

the coating material received in the second mold forms the other of the male seal and the female seal; and the male seal and the female seal are positioned complimentary to each other and in mating configuration.

11. The method as set forth in claim 10, further including before step (c) the steps of:

affixing to the bottom surface of the tooling plate a hanger tooling block and a plug tooling block;

positioning the hanger tooling block and the plug tooling block in the hollow body when positioning the tooling plate between the hollow body and the cover;

inserting a hanger having a hanger cap thereon through a first conduit opening in the hollow body;

securing the hanger to the hanger tooling block with the hanger cap covering an external end of the first conduit opening;

inserting a plug having a plug cap thereon through a second conduit opening in the hollow body; and securing the plug to the plug tooling block with the plug cap covering an external end of the second conduit opening.

12. The method as set forth in claim 11, further including after step (e) and before step (g) the steps of:

removing from the dip-coated hollow body the hanger, the hanger cap, the plug and the plug cap; and separating the hanger tooling block and the plug tooling block from the tooling plate.

13. Apparatus for forming a coated conduit outlet fitting with a male seal and a female seal attached thereto in an area where a cover is affixed to a hollow body and covers an open top of said body, said apparatus comprising:

a tooling plate having the same general outer configuration as an outer peripheral edge of said cover and an upper peripheral edge of said body and positionable between and in contact with said cover and said body, with said tooling plate having a first mold formed in a bottom surface thereof and extending along an outer peripheral edge thereof, with said tooling plate having a second mold formed in a top surface thereof and extending along the outer peripheral edge thereof, with said first mold configured to form one of a male seal and female seal on the upper peripheral edge of said body, with said second mold configured to form the other of a male seal and female seal on the outer peripheral edge of said cover, and with said male seal and female seal complementary to each other and mating in configuration, with said tooling plate including cover attachment means permitting said cover to be attached to said body with said tooling plate positioned therebetween and in contact with said cover and said body, with said first mold aligned with the upper peripheral edge of said body, and with said second mold aligned with the outer peripheral edge of said cover.

14. The apparatus of claim 13 wherein said first mold and said second mold are configured to form tongue and groove seals.

15. The apparatus of claim 13 wherein said first mold is configured to form a tongue seal and said second mold is configured to form a groove seal.

16. The apparatus of claim 13 wherein said first mold is configured to form an inverted V-shaped tongue seal and said second mold is configured to form an inverted V-shaped groove seal.

17. The apparatus as set forth in claim 13, further comprising:

a hanger tooling block affixed to the bottom surface of said tooling plate inward of said first mold and having a hanger attachment means therein; and a hanger configured to pass through a conduit opening through said body and attach to the hanger attachment means, wherein:

said hanger includes a cap means for covering an external end of the conduit opening through which said hanger passes; and said hanger tooling block is configured to fit within the interior of said body and is positioned on said tooling plate to be aligned with said conduit opening when said tooling plate is positioned against said body and covering its open top.

18. The apparatus of claim 17 further including a plug tooling block affixed to the bottom surface of said tooling plate inward of said first mold and spaced from said hanger tooling block and having a plug attachment means therein, a plug configured to pass through another conduit opening through said body and attach to the plug attachment means, with said plug carrying a cap means for covering an external end of the conduit opening through which said plug passes, with said plug tooling block configured to fit within the interior of said body, and with said hanger tooling block and said plug tooling block positioned on said tooling plate to be aligned with an associated conduit opening when said tooling plate is positioned against said body and covering its open top.

19. The apparatus of claim 18 wherein the cap means on each of said hanger and said plug is a cylindrical member carried and positioned thereon to be located adjacent and covering the external end of an associated conduit opening and extending outwardly therefrom when said hanger and said plug are attached to said hanger tooling block and said plug tooling block, respectively, and with an inner end of the cylindrical sleeve adjacent the conduit opening having a beveled outer peripheral edge.

20. The apparatus of claim 19 wherein said cylindrical member is loosely carried on each of said hanger and said plug.

21. The apparatus of claim 17 wherein said tooling plate includes a top tooling plate, a middle tooling plate and a bottom tooling plate stacked together and contacting each other, with said top tooling plate and bottom tooling plate smaller than and fitting within said middle tooling plate, with said first mold formed by an outer first mold portion on a lower surface of said middle tooling plate adjacent its outer peripheral edge and an inner first mold portion along an outer peripheral edge of said bottom tooling plate, and with said second mold formed by an outer second mold portion on an upper surface of said middle tooling plate adjacent its outer peripheral edge and an inner second mold portion along an outer peripheral edge of said top tooling plate.

22. The apparatus of claim 21 wherein said outer first mold portion is an outwardly and downwardly angled surface of said middle tooling plate and said inner first mold portion is an inwardly and downwardly angled surface of said bottom tooling plate, with said outer and inner first mold portions together configured to form an inverted V-shaped tongue seal, and wherein said outer second mold portion is an upwardly oriented, inverted V-shaped projection of said middle tooling plate and said inner second mold portion is a vertical outer surface of said top tooling plate, with said outer and inner second mold portions together configured to form an inverted V-shaped groove seal.

23. The apparatus of claim 21 wherein said tooling plates, at least adjacent to the outer peripheral edges of said top plate and said bottom plate, are spaced apart from each other to form at least one air gap therebetween.

24. The apparatus of claim 23 wherein the spacing between said top and middle tooling plates and the spacing between the middle and bottom tooling plates is each in the range of 0.005" to 0.009".

25. The apparatus of claim 23 wherein said spacing is formed by at least one raised area extending upwardly from an upper surface of said middle tooling plate in an area thereof spaced inwardly from said outer second mold portion and by at least one raised area extending downwardly from a lower surface of said middle tooling plate in an area thereof spaced inwardly from said outer first mold portion.

26. The apparatus of claim 17 further including an air bleed hole extending lengthwise through said hanger and in fluid communication with the interior of said body.

27. The apparatus of claim 26 further including an air hole extending through said tooling plate and in fluid communication with the interior of said body, in fluid communication with the spacing between said top tooling plate and said middle tooling plate, and in fluid communication with the spacing between said middle tooling plate and said bottom tooling plate.

* * * * *